US 6,634,662 B1

(12) United States Patent  
Gu

(10) Patent No.: US 6,634,662 B1
(45) Date of Patent: Oct. 21, 2003

(54) DRIVING SHAFT DEVICE OF TOY TWIST CAR

(76) Inventor: Hong-Jiun Gu, 235 Chung-Ho Box 8-24, Taipei (TW)

( * ) Notice: Subject to any disclaimer, the term of this patent is extended or adjusted under 35 U.S.C. 154(b) by 31 days.

(21) Appl. No.: 10/194,465

(22) Filed: Jul. 15, 2002

(51) Int. Cl.[7] .............................................. B62M 29/00
(52) U.S. Cl. ....................... 280/218; 280/240; 280/255
(58) Field of Search ................................ 280/210, 218, 280/236, 237, 240, 242.1, 246, 252, 255

(56) References Cited

U.S. PATENT DOCUMENTS

| 4,200,304 | A | * | 4/1980 | Hwang | ........................ 280/218 |
| 4,799,697 | A | * | 1/1989 | Williamson et al. | ........... 280/3 |
| 6,264,239 | B1 | * | 7/2001 | Link | ........................... 280/777 |
| 6,499,755 | B2 | * | 12/2002 | Gu | ............................. 280/210 |
| 2002/0084616 | A1 | * | 7/2002 | Gu | ............................. 280/218 |

* cited by examiner

Primary Examiner—Kevin Hurley

(57) ABSTRACT

A driving shaft device of a toy twist car is disclosed. The toy twist car has a car body. A rear side of the car body has an idle wheel and a front end thereof is installed with a vertical driving shaft. A handle is installed and perpendicular to the driving shaft. A lower end of the driving shaft is vertically installed with a driving seat which is extended horizontally. A rear end of the driving seat is installed with two driving wheels at a right and left sides of the driving seat. The driving shaft is a rod body, an axial rod encloses the rod body. A lower and an upper ends of the rod body have outer threads. Surfaces of the rod body and axial rod are formed with buckling structures and a lower end of the axial rod is formed with a connecting shaft and a shoulder portion.

6 Claims, 6 Drawing Sheets

DRIVING SHAFT DEVICE OF TOY TWIST CAR

BACKGROUND OF THE INVENTION

The present invention relates to toy twist car, and particularly to a driving shaft device of a toy twist car which has a preferred buckling effect.

Toy twist cars are swingable and thus are popular to children. However, the prior art twist cars have no firm structure. Especially the driving shaft of the twist car can not firmly secure the car body so that it is very possible that accidents occur as children drive it.

SUMMARY OF THE INVENTION

Accordingly, the primary object of the present invention is to provide a driving shaft device of a toy twist car. The toy twist car has a car body. A rear side of the car body has an idle wheel and a front end thereof is installed with a vertical driving shaft. A handle is installed and perpendicular to the driving shaft. A lower end of the driving shaft is vertically installed with a driving seat which is extended horizontally. A rear end of the driving seat is installed with two driving wheels at a right and left sides of the driving seat.

The driving shaft is a rod body. An axial rod encloses the rod body. A lower and an upper ends of the rod body have outer threads. Surfaces of the rod body and axial rod are formed with buckling structures. A lower end of the axial rod is formed with a connecting shaft and a shoulder portion.

The various objects and advantages of the present invention will be more readily understood from the following detailed description when read in conjunction with the appended drawing.

DETAILED DESCRIPTION OF THE PREFERRED EMBODIMENTS

Figure 1:
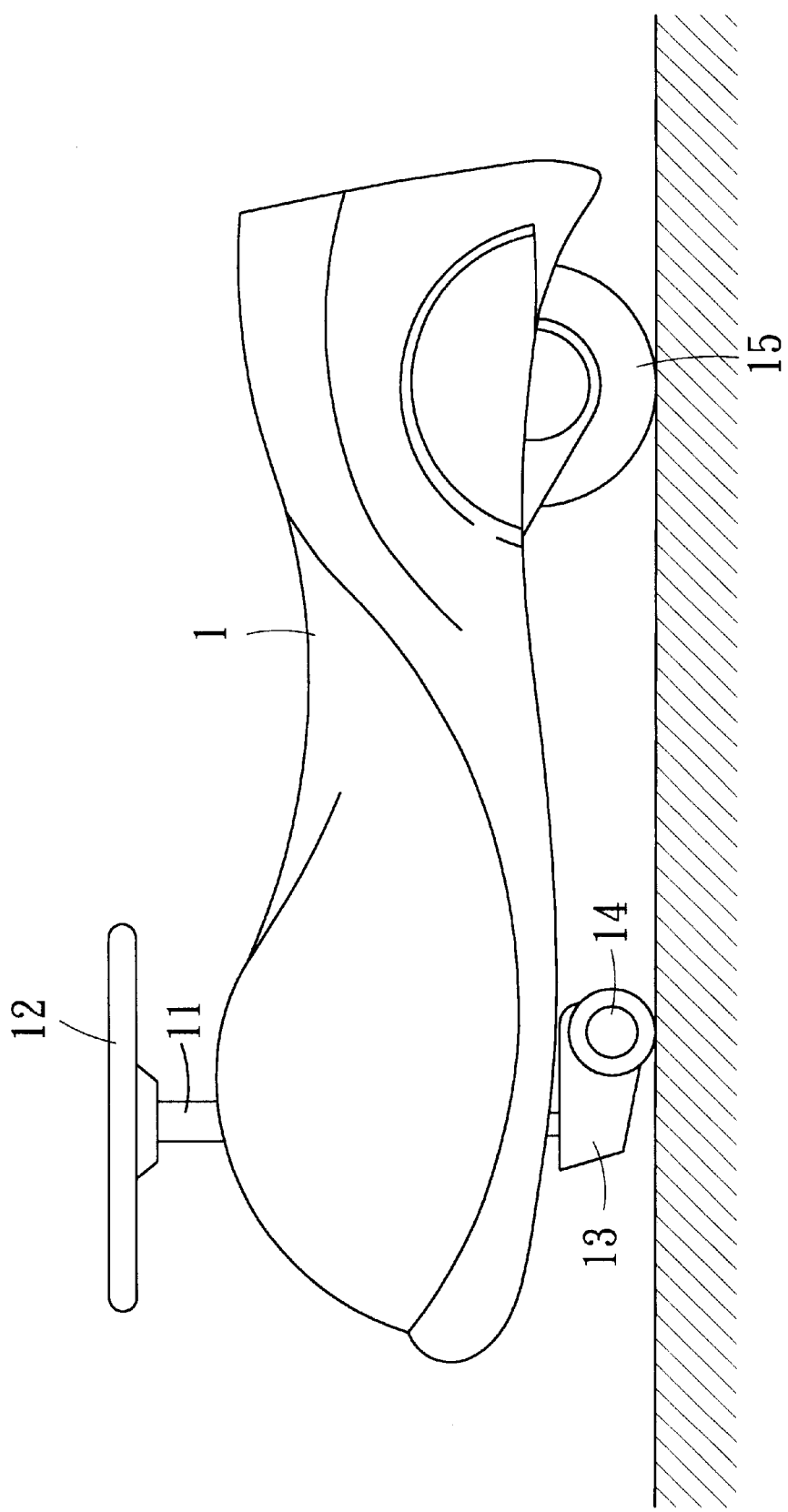
FIG. 1 is a schematic view showing the driving shaft of a toy twist car.

Referring to FIG. 1, the toy twist car is illustrated. The toy twist car has a car body 1 so that a user can enter into the car. A rear side of the car has an idle wheel 15 and the front end thereof is installed with a vertical driving shaft 11. A handle 12 is installed and perpendicular to the driving shaft 11. A lower end of the driving shaft 11 is vertically installed with a driving seat 13 which is extended horizontally. The rear end of the driving seat 13 is installed with two driving wheels 14 at the right and left sides of the seat. By shaking the handle 12, the driving seat 13 can swing along a cambered trace by driving the driving shaft 11. By the driving wheels 14 at the two sides of the driving seat 13, the car moves forwards. The toy twist car is a general used one and thus the moving principle will not be described here.

Figure 2:
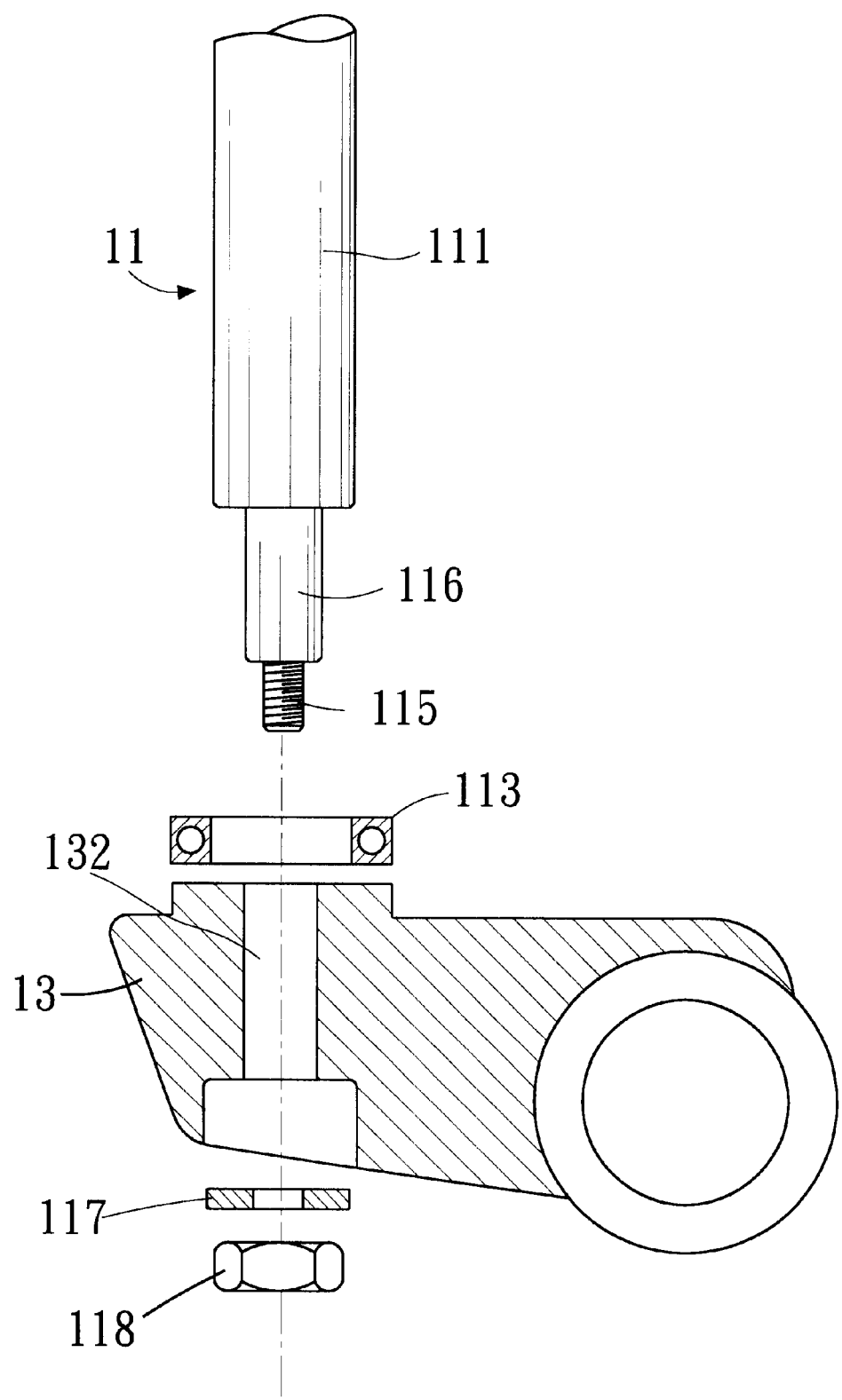
FIG. 2 shows one way of using the driving shaft.

Referring to FIG. 2, the driving shaft 11 has a rod body 111 and a connecting shaft 116 extending from the rod body 111. The driving shaft 11 is formed with a connecting shaft 116 at a position with respect to an axial hole 132 of the driving seat 13. The driving shaft 11 is engaged to the driving seat 13. A lower end of the connecting shaft 116 is installed with an outer thread 115. The driving shaft 11 passes through the driving seat 13 and then passes through a washer 117. Then a female screw 118 is used to lock a male thread extending from the distal end of the connecting shaft 116. Thereby, the driving seat 13 is fixed with respect to the rod 111.

A bearing 113 installed above the driving seat 13 is molded to the car body. In forming the driving shaft 11, the connecting shaft 116 is firstly formed below the rod body 111 and then the outer thread is formed. The process is complex. The rod body is a solid body and is heavy.

Figure 3:
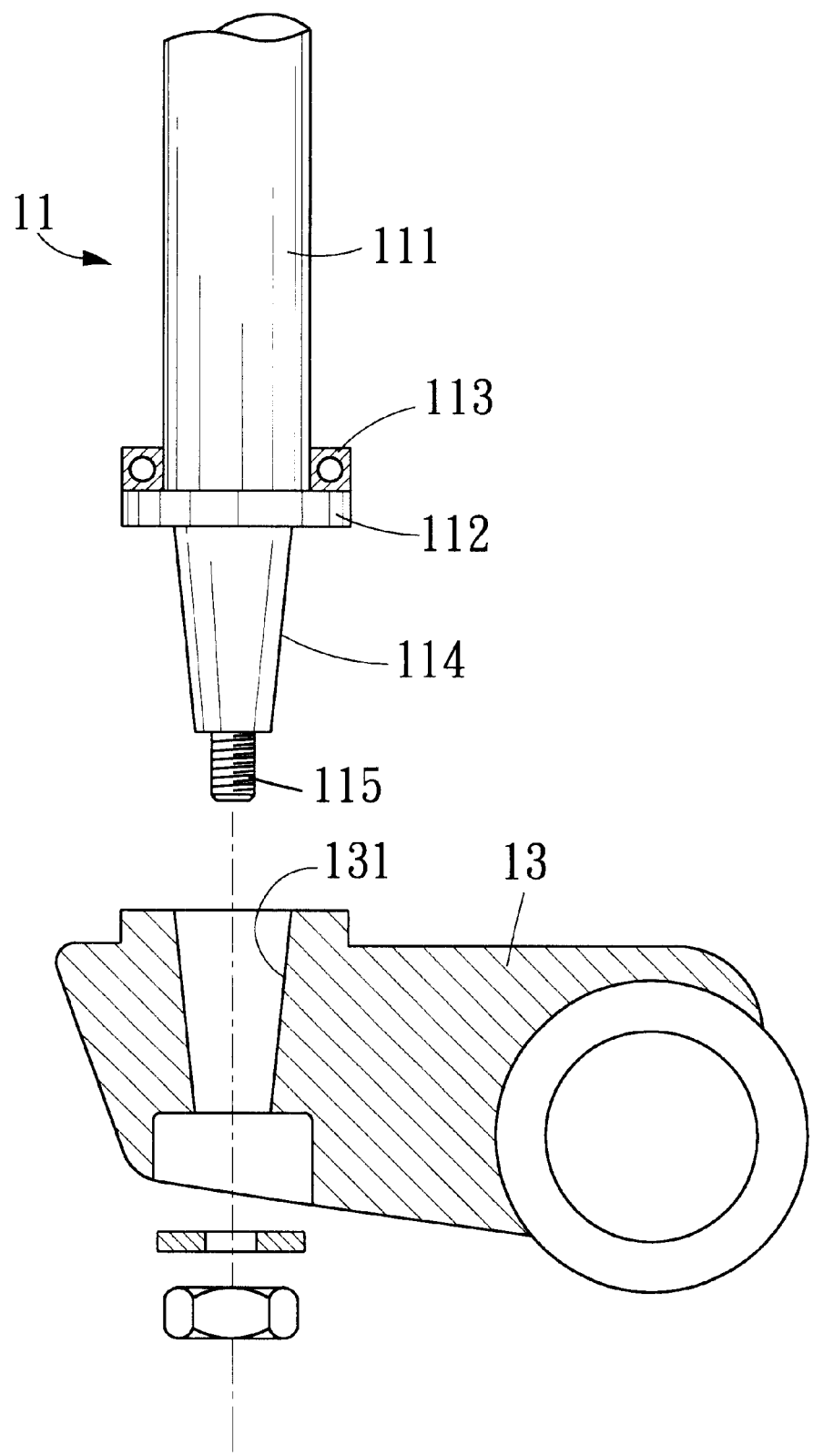
FIG. 3 shows another way of using the driving shaft.
Figure 4:
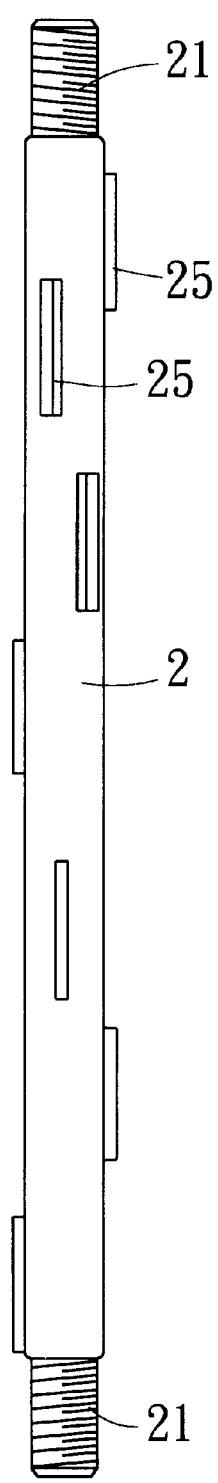
FIG. 4 is a perspective view of the rod body of the present invention.

The connecting shaft 116 is a straight round rod and thus it can not effectively firmly secured to the driving seat 13. The connecting shaft 116 is possibly slid with respect to the axial hole 132. With reference to FIG. 3, a shoulder portion 112 is formed at a lower side of the rod body 111. A bearing 113 is formed above the shoulder portion 112 and a lower end thereof is formed with a taper shaft 114 with respect to a taper hole 131. A female screw is used to lock the driving shaft 11 to the driving seat 13. By the till surfaces of the taper shaft 114 and taper hole 131, a firm combination can be formed. However, many processes are necessary to form the driving shaft 11.

To easily form a driving shaft 11, the other way for forming a driving shaft 11 is described hereinafter.

Figure 5:
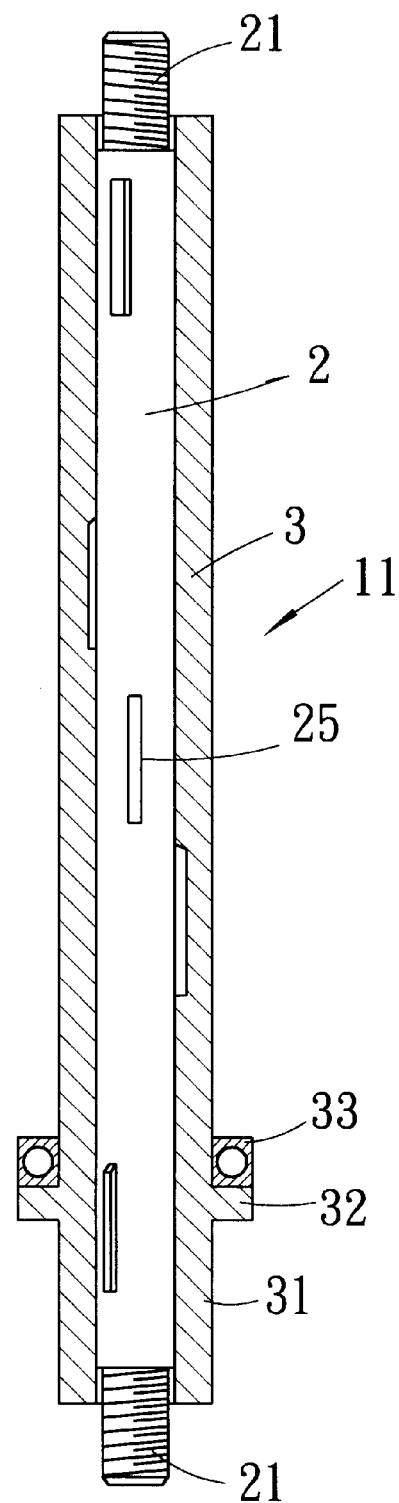
FIG. 5 is an assembled view of the present invention.

Referring to FIG. 5, a rod body 2 with a plurality of buckling grooves 25 are formed within an axial rod 3. In manufacturing, the rod body 2 is firstly injected into the axial rod 3. A lower end of the axial rod 3 is formed with a connecting shaft 31 directly and a shoulder portion 32 is formed above the connecting shaft 31. A bearing 32 is placed above the shoulder portion 32. Outer threads 21 are exposed from the two ends of the rod body 2. The connecting shaft 31 can be engaged to the driving shaft 11 directly, as shown in FIG. 2. Thereby, the manufacturing process is easy and the weight is light. The connecting shaft 32 is made of plastic material and the driving seat 13 is also made of plastics. Thereby, when the connecting shaft 32 is assembled with the driving seat 13, the connection is firm. Moreover, the connecting shaft 32 has a desired elasticity, since it is formed by plastics. Thereby, the two can be assembled in force and has a preferred strength. A depth of the outer thread 21 can be increased. Moreover, a small section of the outer thread 21 can be enclosed within the axial rod 3. When parts of the lower and upper outer threads 21 are enclosed within the axial rod 3, the outer threads 21 are used to lock the rod body 2 and the axial rod 3. The lock force can be directly transferred to the two ends of the axial rod 3 so that the lock force is uniformly distributed in the axial rod 3.

Figure 6:
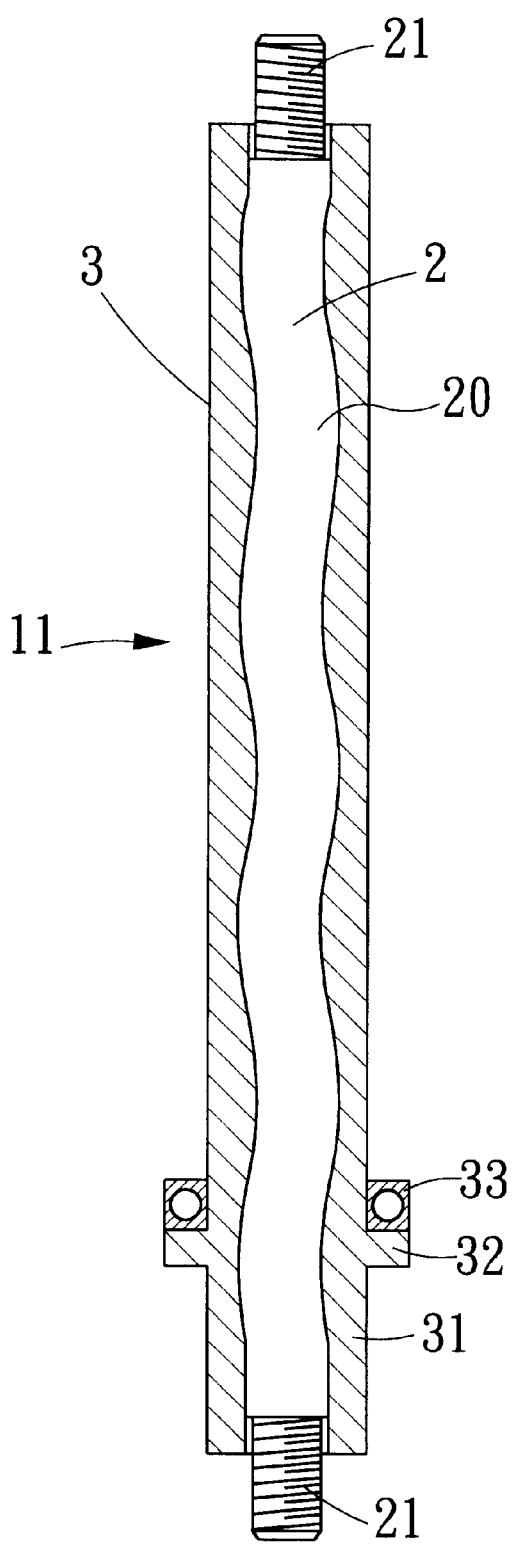
FIG. 6 shows one embodiment of the present invention.

With reference to FIG. 6, other than above-mentioned buckling grooves, the rod body 2 may have a wave-like shape 20 so that the rod body 2 and the axial rod 3 are firmly secured.

Figure 7:
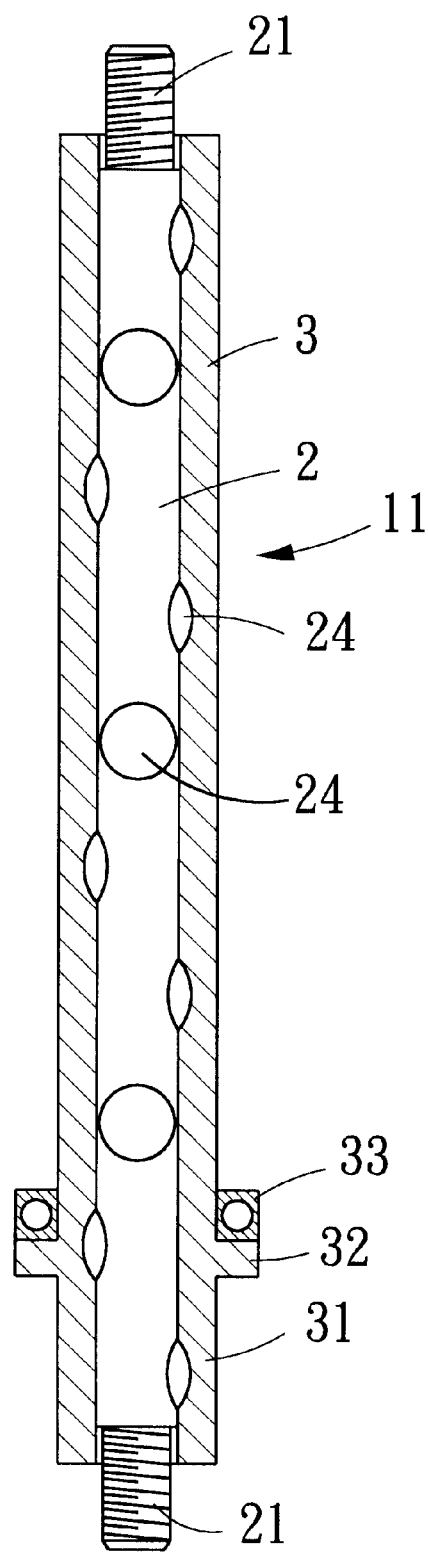
FIG. 7 shows another embodiment of the present invention.

As shown in FIG. 7, a plurality of protruding particles 24 are formed on the surface of the rod body 2 so as to have a buckling effect in the axial rod 3.

Figure 8:
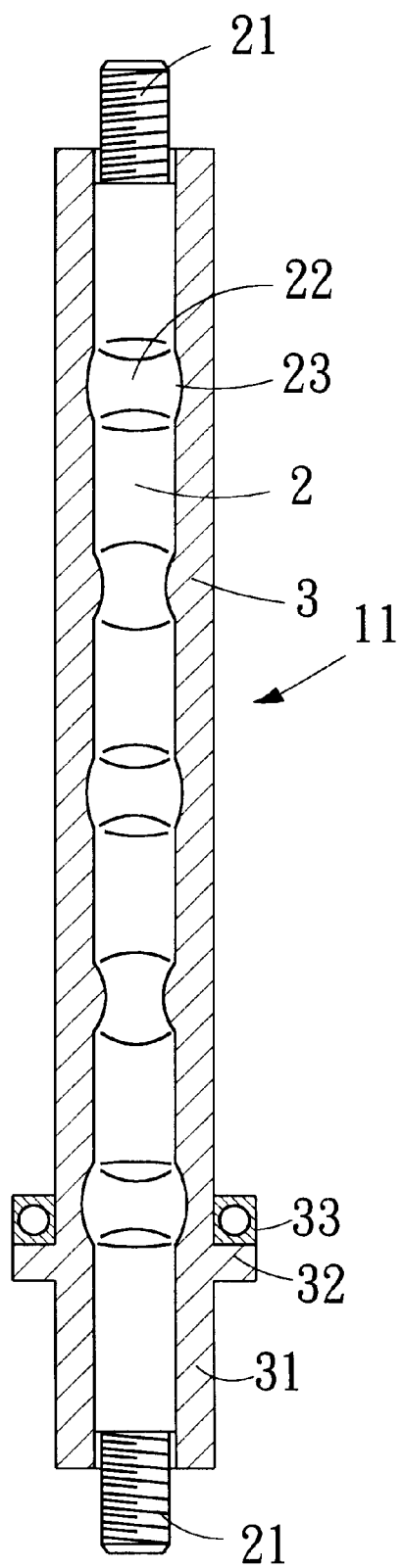
FIG. 8 shows a further embodiment of the present invention.

Referring to FIG. 8, a plurality of concave portions 22 are formed on the rod body 2, while a plurality of wing portions 23 are formed due to the formation of the concave portions 22. The concave portions 22 are helpful for the engagement of the rod body 2 and the axial rod 3.

Figure 9:
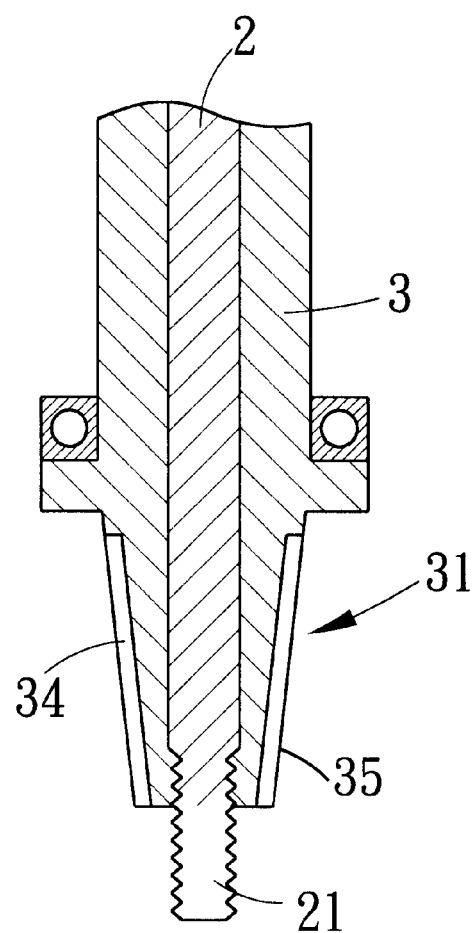
FIG. 9 shows another embodiment of the connecting shaft of the present invention.

With reference to FIG. 9, another embodiment of the present invention is illustrated. In that, a taper shaft 35 is used to replaced the driving shaft 31 in FIG. 8. A longitudinal rack 34 is formed on the outer surface of the taper shaft 35. This design is helpful for increasing the contact surface and buckling effect.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A driving shaft device of a toy twist car; the toy twist car having a car body; a rear side of the car body having an idle wheel and a front end thereof being installed with a vertical driving shaft; a handle is installed and perpendicular to the driving shaft; a lower end of the driving shaft is vertically installed with a driving seat which is extended horizontally; a rear end of the driving seat is installed with two driving wheels at a right and left sides of the driving seat; characterized in that:

the driving shaft is a rod body, an axial rod encloses the rod body; a lower and an upper ends of the rod body have outer threads; surfaces of the rod body and axial rod are formed with buckling structures; a lower end of the axial rod is formed with a connecting shaft and a shoulder portion.

2. The driving shaft device of a toy twist car as claimed in claim 1, wherein a surface of the rod body is formed with a wave-like structure.

3. The driving shaft device of a toy twist car as claimed in claim 1, wherein the surface of the rod body has a plurality of concave portions and wing portions so as to form the buckling structure.

4. The driving shaft device of a toy twist car as claimed in claim 1, wherein a plurality of slots are formed on the surface of the rod body to be as the buckling structure.

5. The driving shaft device of a toy twist car as claimed in claim 1, wherein a plurality of buckling grooves are formed on the surface of the rod body to be as the buckling structure.

6. The driving shaft device of a toy twist car as claimed in claim 5, wherein the connecting shaft has a tilt surface.

* * * * *